United States Patent
Ikeda et al.

(10) Patent No.: US 11,761,787 B2
(45) Date of Patent: Sep. 19, 2023

(54) MAP INFORMATION CORRECTION METHOD, DRIVING ASSISTANCE METHOD, AND MAP INFORMATION CORRECTION DEVICE

(71) Applicants: Nissan Motor Co., Ltd., Yokohama (JP); Renault S.A.S., Boulogne-Billancourt (FR)

(72) Inventors: Akinobu Ikeda, Kanagawa (JP); Susumu Fujita, Kanagawa (JP); Reo Sakakura, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/917,481

(22) PCT Filed: Apr. 8, 2020

(86) PCT No.: PCT/IB2020/000335
§ 371 (c)(1),
(2) Date: Oct. 6, 2022

(87) PCT Pub. No.: WO2021/205193
PCT Pub. Date: Oct. 14, 2021

(65) Prior Publication Data
US 2023/0152120 A1    May 18, 2023

(51) Int. Cl.
*G01C 21/00*  (2006.01)
*G01C 21/32*  (2006.01)
*G01C 21/36*  (2006.01)

(52) U.S. Cl.
CPC ......... *G01C 21/3815* (2020.08); *G01C 21/32* (2013.01); *G01C 21/3658* (2013.01); *G01C 21/3837* (2020.08)

(58) Field of Classification Search
CPC .......................... G01C 21/3815; G01C 21/32; G01C 21/3658; G01C 21/3837
See application file for complete search history.

(56) References Cited

U.S. PATENT DOCUMENTS 9,990,375 B2   6/2018  Mizoguchi
10,481,277 B2  11/2019 Schmid
(Continued)

FOREIGN PATENT DOCUMENTS

CN  103954275 A  * 7/2014  ............. G01C 21/30
EP  3640681 A1  * 4/2020  ........... G01C 21/005
(Continued)

*Primary Examiner* — Rami Khatib
(74) *Attorney, Agent, or Firm* — Young Basile Hanlon & MacFarlane, P.C.

(57) ABSTRACT

A map information correction method for correcting map information includes information of a lane boundary line, the method further including: detecting a position with respect to an own vehicle of a lane boundary line set in place on a road surface around the own vehicle; estimating an own position on a map of the own vehicle; and correcting, depending on the estimated own position and the detected position of the lane boundary line, a position of the lane boundary line included in the map information by, in a first region comparatively close to the own vehicle, a larger rotational correction amount than in a second region comparatively far from the own vehicle and, in the second region, a larger translational correction amount than in the first region.

12 Claims, 11 Drawing Sheets

(56) References Cited

U.S. PATENT DOCUMENTS

| | | | | |
|---|---|---|---|---|
| 10,627,816 B1* | 4/2020 | Silver | ............. | B60W 30/10 |
| 2008/0319657 A1* | 12/2008 | Gao | ............. | G01C 21/30 |
| | | | | 701/532 |
| 2016/0259814 A1 | 9/2016 | Mizoguchi | | |
| 2017/0038477 A1* | 2/2017 | Schmid | ............. | G01S 19/51 |
| 2018/0202815 A1* | 7/2018 | Asai | ............. | G01S 17/86 |
| 2020/0011978 A1 | 1/2020 | Chu | | |
| 2021/0090285 A1* | 3/2021 | Sagong | ............. | G06T 11/00 |
| 2021/0199437 A1 | 7/2021 | Breed et al. | | |

FOREIGN PATENT DOCUMENTS

| | | | | |
|---|---|---|---|---|
| JP | 2016-057750 A | 4/2016 | | |
| JP | 2016-161456 A | 9/2016 | | |
| JP | 2017-513020 A | 5/2017 | | |
| JP | 2019-508677 A | 3/2019 | | |
| JP | 2019-179217 A | 10/2019 | | |
| WO | 2017/120595 A2 | 7/2017 | | |
| WO | 2018/225198 A1 | 12/2018 | | |
| WO | WO-2019043833 A1 * | 3/2019 | ............ | B60W 30/10 |

* cited by examiner

MAP INFORMATION CORRECTION METHOD, DRIVING ASSISTANCE METHOD, AND MAP INFORMATION CORRECTION DEVICE

TECHNICAL FIELD

The present invention relates to a map information correction method, a driving assistance method, and a map information correction device.

BACKGROUND

In JP 2016-161456 A, a map data processing device is disclosed that calculates data for update from map data calculated based on a recognition result of a surrounding environment and a travel state of a vehicle and, when error between map data in a map database and the data for update is larger than a criterion value, updates the map data in the map database.

SUMMARY

Driving assistance control that, using map information representing positions of lane boundaries, generates a travel route based on lane boundaries in the map information and controls vehicle behavior, such as speed of a vehicle and a steering angle, in such a way as to assist travel of the vehicle along the generated travel route has been known. When a lane boundary in the map information is corrected while such driving assistance control is in execution, there is a possibility that a rapid behavior change is caused to occur to the vehicle due to change in the travel route having been set based on the lane boundary.

An object of the present invention is to provide a map information correction method that is capable of preventing behavior change of a vehicle even when map information including position information of lane boundaries used in driving assistance control is corrected while the driving assistance control is in execution.

According to an aspect of the present invention, there is provided a map information correction method for correcting map information including information of a lane boundary line, the method including: detecting a position with respect to an own vehicle of a lane boundary line set in place on a road surface around the own vehicle; estimating an own position on a map of the own vehicle; and correcting, depending on the estimated own position and the detected position of the lane boundary line, a position of the lane boundary line included in the map information by, in a first region comparatively close to the own vehicle, a larger rotational correction amount than in a second region comparatively far from the own vehicle and, in the second region, a larger translational correction amount than in the first region.

According to an aspect of the present invention, it is possible to prevent behavior change of a vehicle even when map information including position information of lane boundaries is corrected while driving assistance control is in execution.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

First Embodiment (Configuration)

Figure 1:
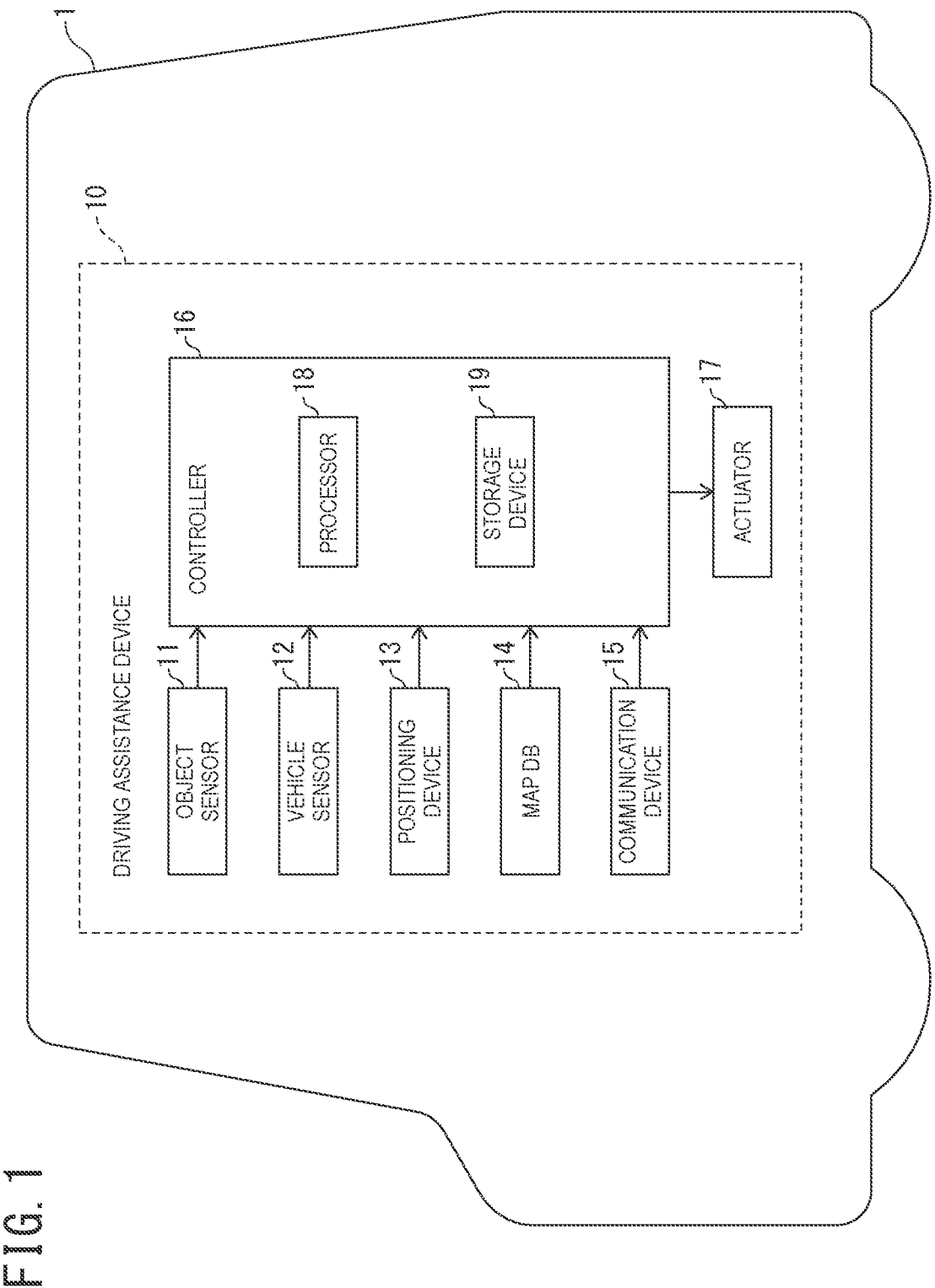
FIG. 1 is a schematic configuration diagram of a driving assistance device of embodiments.

FIG. 1 is now referred to. An own vehicle 1 includes a driving assistance device 10 configured to perform driving assistance of the own vehicle 1. The driving assistance performed by the driving assistance device 10 is self-driving control that, based on, for example, a travel environment around the own vehicle 1 and map information, causes the own vehicle 1 to self-drive without involvement of a driver. Note that, although the driving assistance device 10 may be a device that executes driving assistance control to assist driving performed by a passenger by controlling some functions of apparatuses involved in traveling of the own vehicle 1, such as steering, accelerator opening, and a steering angle, based on a travel environment around the own vehicle 1 and map information, the following description will be made assuming, unless otherwise specifically stated, that the self-driving control that causes the own vehicle 1 to self-drive without involvement of a driver is executed.

The driving assistance device 10 includes object sensors 11, vehicle sensors 12, a positioning device 13, a map database 14, a communication device 15, a controller 16, and actuators 17. In the drawings, the map database is denoted as "map DB".

The object sensors 11 include a plurality of object detection sensors of different types that are mounted on the own vehicle 1 and detect objects around the own vehicle 1, such as a laser radar, a millimeter-wave radar, a camera, and a light detection and ranging or laser imaging detection and ranging (LIDAR).

The vehicle sensors 12 are mounted on the own vehicle 1 and detects various information (vehicle signals) that can be acquired from the own vehicle 1. The vehicle sensors 12 include a vehicle speed sensor to detect traveling speed (vehicle speed) of the own vehicle 1, wheel speed sensors to detect rotational speeds of respective tires that the own vehicle 1 includes, a triaxial acceleration sensor (G sensor) to detect acceleration (including deceleration) of the own vehicle 1 in three axial directions, a steering angle sensor to detect a steering angle (including a turning angle), a gyro sensor to detect angular velocity generated in the own vehicle 1, a yaw rate sensor to detect a yaw rate, an accelerator sensor to detect accelerator opening of the own vehicle, and a brake sensor to detect a brake operation amount by the driver.

The positioning device 13 includes a global navigation satellite system (GNSS) receiver and, by receiving radio waves from a plurality of navigation satellites, measures a current position of the own vehicle 1. The GNSS receiver may be, for example, a global positioning system (GPS) receiver or the like. The positioning device 13 may be, for example, an inertial navigation device.

The map database 14 may store high-definition map information (hereinafter, simply referred to as "high-definition map"), which is suitable as a map for self-driving. The high-definition map is map data of higher precision than map data for navigation (hereinafter, simply referred to as "navigation map") and includes information in units of lanes, which is more detailed than information in units of roads. Hereinafter, a map represented by map information in the map database 14 is sometimes simply referred to as "map".

For example, the high-definition map includes, as information in units of lanes, information of lane nodes that indicate reference points on a lane reference line (for example, a line at the center of a lane) and information of lane links that indicate forms of lane sections between lane nodes.

Information of each lane node includes an identification number and position coordinates of the lane node, the number of connected lane links, and identification numbers of connected lane links. Information of each lane link includes an identification number of the lane link, the type of the lane, width of the lane, a shape of the lane, shapes and the types of lane boundary lines, and a shape of a lane reference line.

The lane boundary line is a pavement marking set in place on a road surface to indicate a lane boundary, and examples of the lane boundary line includes a "roadway center line", a "lane boundary line", and a "roadway outside line".

The high-definition map includes, as information of a shape of a lane, information of positions of a plurality of boundary points forming a lane boundary, and the shape of a lane boundary line is represented by a set of such boundary points. As information of the shape of a lane boundary line, point group data representing positions on the edge of a lane-width direction edge portion of the lane boundary line may be used. Although, in the present embodiment, it is assumed that the shape of a lane boundary line in the high-definition map is represented by a set of a plurality of boundary points forming the lane boundary, without being limited to the above, the shape of a lane boundary line may be represented by lines.

The high-definition map further includes the types and position coordinates of ground objects, such as a traffic light, a stop line, a road sign, a building, a utility pole, a curb, and a crosswalk, that exist on a lane or in the vicinity of the lane and information of the ground objects, such as identification numbers of lane nodes and identification numbers of lane links that correspond to the position coordinates of the ground objects.

Since the high-definition map includes node information and link information in units of lanes, it is possible to specify a lane in which the own vehicle 1 travels in a travel route. The high-definition map has a coordinate system that can represent positions in the extending direction and width direction of each lane. The high-definition map has coordinates (for example, longitude, latitude, and altitude) that can represent positions in the three-dimensional space, and lanes and the above-described ground objects may be described as shapes in the three-dimensional space.

The communication device 15 performs wireless communication with a communication device external to the own vehicle 1. A communication method used by the communication device 15 may be, for example, wireless communication via a public mobile telephone network, vehicle-to-vehicle communication, road-to-vehicle communication, or satellite communication.

The controller 16 is an electronic control unit (ECU) that performs driving assistance control of the own vehicle 1. The controller 16 controls the actuators 17 by outputting control signals to the actuators 17, based on a travel environment around the own vehicle 1, which was detected by the object sensors 11, and the map information in the map database 14, and thereby executes the self-driving control that causes the own vehicle 1 to self-drive.

Specifically, the controller 16 calculates a current position (own position) of the own vehicle 1 on the map from a current position of the own vehicle 1 detected by the positioning device 13 and also sets a travel trajectory (travel trajectory represented by a relative position with respect to a lane boundary line) from the own position to a position a predetermined distance ahead, based on the own position and lane boundary lines on the map. The controller 16 controls, based on the own position on the map and the set travel trajectory, the own vehicle in such a way that the own vehicle 1 travels along the travel trajectory, by outputting control signals to the actuators 17 in such a way that the own position coincides with a position on the travel trajectory.

In addition, the controller 16, as described later, executes correction processing of map information of correcting lane boundary lines included in the map information in the map database 14, based on relative positions of the lane boundary lines with respect to the own vehicle, which is detected based on detection results by the object sensors 11, and the current position (own position) of the own vehicle 1. Details of the correction processing will be described later.

The controller 16 includes a processor 18 and peripheral components, such as a storage device 19. The processor 18 may be, for example, a central processing unit (CPU) or a micro-processing unit (MPU).

The storage device 19 may include a semiconductor storage device, a magnetic storage device, an optical storage device, and the like. The storage device 19 may include registers, a cache memory, and a memory used as a main storage device, such as a read only memory (ROM) and a random access memory (RAM).

Functions of the controller 16, which will be described below, may be achieved by, for example, the processor 18 executing computer programs stored in the storage device 19.

Note that the controller 16 may be formed by dedicated hardware for executing information processing that will be described below.

For example, the controller 16 may include a functional logic circuit that is implemented in a general-purpose semiconductor integrated circuit. For example, the controller 16 may include a programmable logic device, such as a field-programmable gate array (FPGA), and the like.

The actuators 17 operate a steering wheel, accelerator opening, and a braking device of the own vehicle in accordance with control signals output from the controller 16 and thereby generate vehicle behavior of the own vehicle. The actuators 17 include a steering actuator, an accelerator opening actuator, and brake control actuators. The steering actuator controls steering direction and the amount of steering of the own vehicle 1. That is, the steering actuator controls a steering mechanism.

The accelerator opening actuator controls the accelerator opening of the own vehicle. That is, the accelerator opening actuator controls output from a power unit of the own vehicle 1. The brake control actuators control braking action of the braking devices of the own vehicle 1.

Next, an example of the correction processing of the map information in the map database 14 executed by the controller 16 will be described. The controller 16, while executing the self-driving control based on the map information in the map database 14, corrects lane boundary lines in the map information, based on a detection result in which the lane boundary lines were detected by the object sensors 11.

Figure 2A:
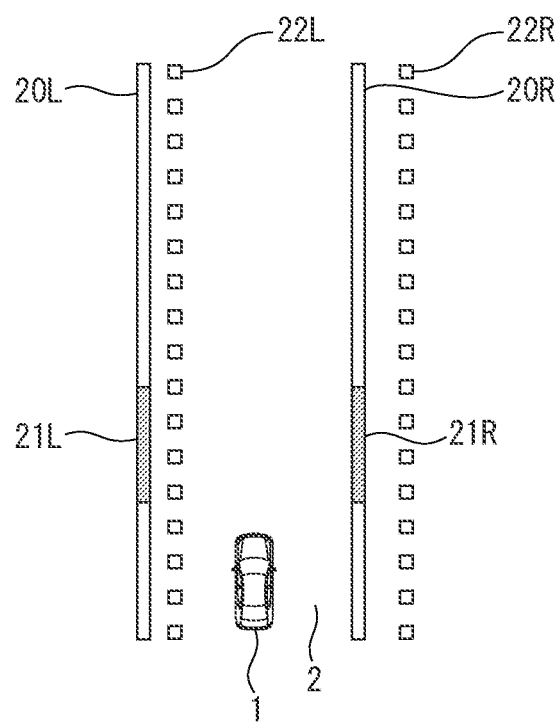
FIG. 2A is an explanatory diagram of an example of differences between detection results of lane boundary lines and lane boundary lines in map information.

FIG. 2A is now referred to. The reference sign 20L indicates a left side lane boundary line that is a lane boundary line on the left side of a lane 2 in which the own vehicle 1 travels, and the reference sign 20R indicates a right side lane boundary line that is a lane boundary line on the right side of the lane 2. The left side lane boundary line 20L and the right side lane boundary line 20R are sometimes collectively referred to as "lane boundary lines 20".

A hatched portion 21L indicates a left side detection portion that is a portion of the left side lane boundary line 20L that was detected by the object sensors 11, and a hatched portion 21R indicates a right side detection portion that is a portion of the right side lane boundary line 20R that was detected by the object sensors 11. The left side detection portion 21L and the right side detection portion 21R are sometimes collectively referred to as "detection portions 21".

Each of square marks 22L and square marks 22R indicate positions on the map of a plurality of boundary points forming one of the lane boundary lines of the lane 2.

Each of the square marks 22L is a left side boundary point forming the lane boundary line on the left side of the lane 2, and each of the square marks 22R is a right side boundary point forming the lane boundary line on the right side of the lane 2. The left side boundary points 22L and the right side boundary points 22R are sometimes collectively referred to as "boundary points 22". Note that, since a lane boundary line is formed by a plurality of boundary points 22, it may be rephrased that a boundary point 22 is a portion of a lane boundary line. Therefore, hereinafter, a portion of a lane boundary line is sometimes represented as a boundary point 22.

The controller 16, using the object sensors 11, detects relative positions of the detection portions 21 with respect to the position of the own vehicle 1.

In addition, the controller 16, using a measurement result by the positioning device 13, odometry using detection results from the vehicle sensors 12, and map matching between detection results of target objects by the object sensors 11 and the map database 14, estimates an own position of the own vehicle 1 on the map.

The controller 16 calculates, based on the relative positions of the detection portions 21 and the own position of the own vehicle 1, positions on the map of the detection portions 21.

On this occasion, caused by estimation error of the own position of the own vehicle 1 and error of the map information itself in the map database 14, differences sometimes occur between the positions of the detection portions 21 and the boundary points 22, as illustrated in FIG. 2A.

Accordingly, the controller 16 corrects the map in the map database 14 in such a manner as to cause the positions on the map of the boundary points 22 to coincide with the actually detected positions of the detection portions 21.

Figure 2B:
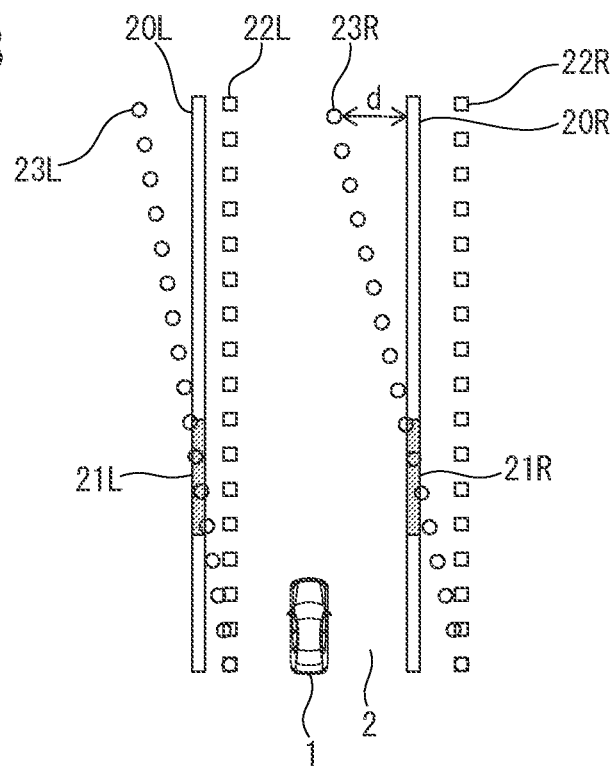
FIG. 2B is an explanatory diagram of an example of a case where map information is corrected only by rotation.

The correction of a map includes correction of a rotational component and correction of a translational component. FIG. 2B illustrates a case where the boundary points 22 are corrected by rotation.

Each of round marks 23L indicates a left side corrected boundary point that is a boundary point to which a left side boundary point 22L has been corrected, and each of round marks 23R indicates a right side corrected boundary point that is a boundary point to which a right side boundary point 22R has been corrected. The left side corrected boundary points 23L and the right side corrected boundary points 23R are sometimes collectively referred to as "corrected boundary points 23".

In the example in FIG. 2B, the boundary points 22 are rotated using the position of the own vehicle 1 as a reference and the corrected boundary points 23 are calculated in such a manner that differences between the corrected boundary points 23 and the detection portions 21 are minimized. As a result, the positions of the boundary points 22 are corrected in such a manner that the lane boundaries are rotated using the position of the own vehicle 1 as a reference.

Thus, even when the map is corrected while the self-driving control is in execution, behavior change of the own vehicle 1 is small because it is only required to adjust the attitude of the own vehicle 1 to a change in the direction of the lane boundaries.

However, a correction amount becomes larger as a boundary point 22 is farther from the own vehicle 1, and, contrary to expectation, there is a possibility that a deviation amount d between the corrected boundary points 23 and the actual lane boundary lines 20 increases.

Figure 3A:
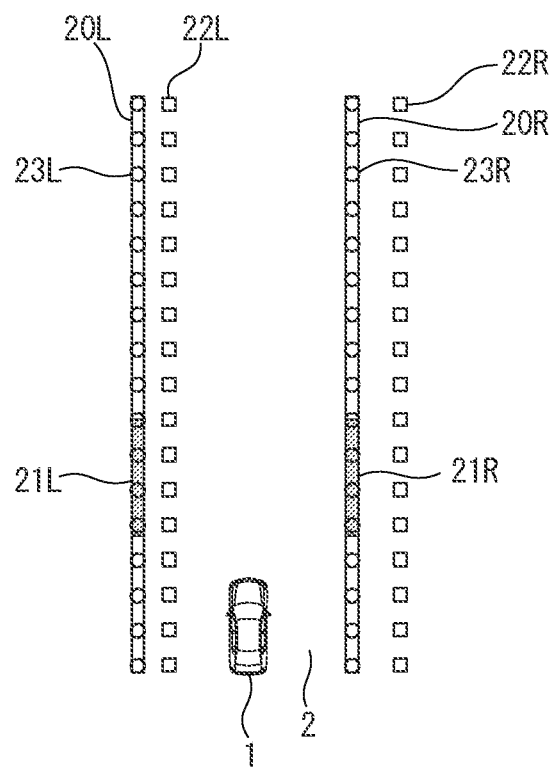
FIG. 3A is an explanatory diagram of an example of a case where the map information is corrected only by translation.

On the other hand, FIG. 3A illustrates a case where the boundary points 22 are corrected by translation. The controller 16 translates the boundary points 22 and calculates corrected boundary points 23 in such a manner as to minimize differences between the corrected boundary points 23 and the detection portions 21.

In this case, the intra-lane position of the own vehicle 1 is caused to instantaneously change by the translation of the lane boundaries. Thus, when the map is corrected while the self-driving control is in execution, there is a possibility that, in order to correct the displacement of the intra-lane position of the own vehicle 1, a rapid behavior change is caused to occur on the own vehicle 1.

Figure 3B:
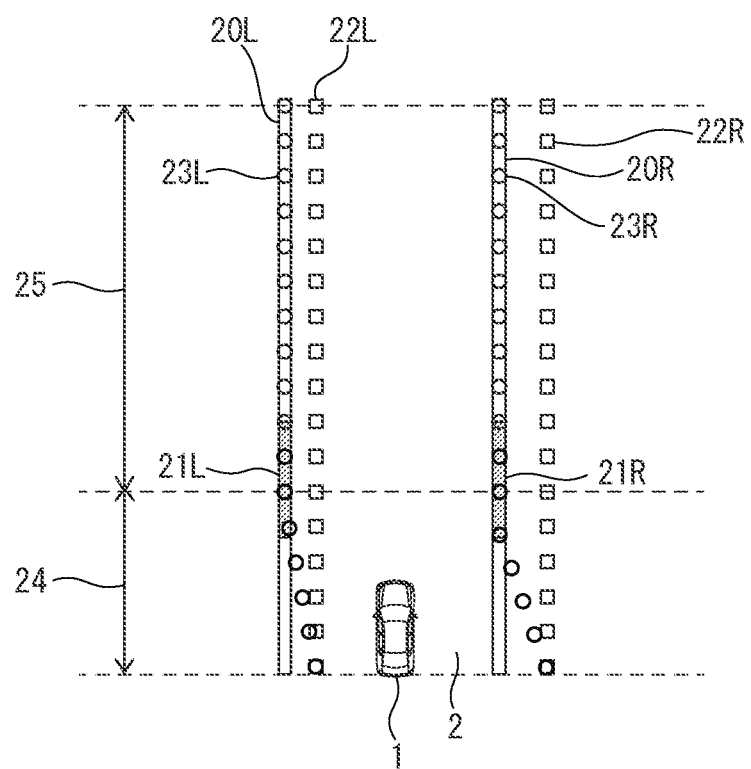
FIG. 3B is an explanatory diagram of an example of a map information correction method of the embodiments.

Accordingly, the controller 16 corrects the positions of boundary points 22 by a larger rotational correction amount in a first region 24 that is comparatively close to the own vehicle 1 than in a second region 25 that is comparatively far from the own vehicle 1, as illustrated in FIG. 3B. In addition, the controller 16 corrects the positions of boundary points 22 by a larger translational correction amount in the second region 25 than in the first region 24.

Because of this configuration, in the first region 24, which is comparatively close to the own vehicle 1, the translational correction amount becomes small. Thus, even when the positions of the boundary points 22 on the map are corrected while the self-driving control is in execution, it is possible to reduce behavior change of the own vehicle 1.

In addition, in the second region 25, which is comparatively far from the own vehicle 1, the rotational correction amount becomes small. Thus, it is possible to reduce the deviation amount d between the corrected boundary points 23 and the actual lane boundary lines 20.

Next, a functional configuration of the controller 16 will be described in detail with reference to FIG. 4. The controller 16 includes an object detection unit 30, an own position estimation unit 31, a map acquisition unit 32, a detection integration unit 33, an object tracking unit 34, a map information correction unit 35, a driving action determination unit 36, a trajectory generation unit 37, and a vehicle control unit 38.

The object detection unit 30 detects, based on detection signals from the object sensors 11, positions, attitudes, sizes, speeds, and the like of objects around the own vehicle 1, such as a vehicle, a motorcycle, a pedestrian, and an obstacle. The object detection unit 30 outputs detection results representing two-dimensional positions, attitudes, sizes, speeds, and the like of objects in, for example, a zenith view (also referred to as a plan view) in which the own vehicle 1 is viewed from the air.

The own position estimation unit 31 measures, based on a measurement result by the positioning device 13 and odometry using detection results from the vehicle sensors 12, the own position (position on the map) of the own vehicle 1, that is, the position of the own vehicle 1 with respect to a predetermined reference point, attitude, and speed of the own vehicle 1.

The map acquisition unit 32 acquires map information indicating a structure of a road on which the own vehicle 1 is to travel, from the map database 14. The map acquisition unit 32 may acquire map information from an external map data server through the communication device 15.

The detection integration unit 33 integrates a plurality of detection results that the object detection unit 30 respectively acquired from a plurality of object detection sensors and outputs one detection result with respect to each of the respective objects.

Specifically, the detection integration unit 33 calculates, from behavior of objects respectively acquired from the object detection sensors, the most reasonable behavior of the objects that minimizes error, in consideration of error characteristics of the respective object detection sensors.

Specifically, by using a known sensor fusion technology, the detection integration unit 33 comprehensively evaluates detection results acquired by a plurality of types of sensors and acquires a more accurate detection result.

The object tracking unit 34 tracks objects detected by the object detection unit 30. Specifically, based on the detection results integrated by the detection integration unit 33, the object tracking unit 34 performs verification of identity (association) of objects between different times from behaviors of the objects output at different times and predicts, based on the association, behavior of the objects, such as speed.

The map information correction unit 35 determines a degree of reliability of a detection result of the detection portions 21 that was detected by the detection integration unit 33 and the object tracking unit 34.

For example, the map information correction unit 35 may determine the degree of reliability according to deviation between the positions of the detection portions 21 detected in the previous detection and the positions of the detection portions 21 detected in the current detection. The map information correction unit 35 may also determine the degree of reliability according to deviation between the positions of the boundary points 22 in the map information and the positions of the detection portions 21. For example, the map information correction unit 35 may determine that the degree of reliability is high when a deviation amount is less than a threshold value and determine that the degree of reliability is low when the deviation amount is greater than or equal to the threshold value. The map information correction unit 35 may also determine the degree of reliability according to a degree of clarity of the detection portions 21 detected by the object sensors 11.

When determining that the degree of reliability of a detection result of the detection portions 21 is high, the map information correction unit 35 corrects, based on the detection result of the detection portions 21 and the own position of the own vehicle 1 estimated by the own position estimation unit 31, map information acquired from the map database 14. When the map acquisition unit 32 acquired map information from an external map data server, the map information correction unit 35 corrects the map information acquired from the external map data server.

On the contrary, when determining that the degree of reliability of the detection result of the detection portions 21 is not high, the map information correction unit 35 prohibits correction of the map information.

The map information correction unit 35 includes a lane matching unit 35a, a correction parameter calculation unit 35b, and a lane correction unit 35c.

The lane matching unit 35a identifies positions on the map corresponding to the positions of points that the object sensors 11 detected as the detection portions 21. The points that the object sensors 11 detected as the detection portions 21 are referred to as "detection points". The points on the map corresponding to the detection points are referred to as "corresponding points". The lane matching unit 35a independently identifies corresponding points with respect to each of the left side detection portion 21L and the right side detection portion 21R.

Figure 5:
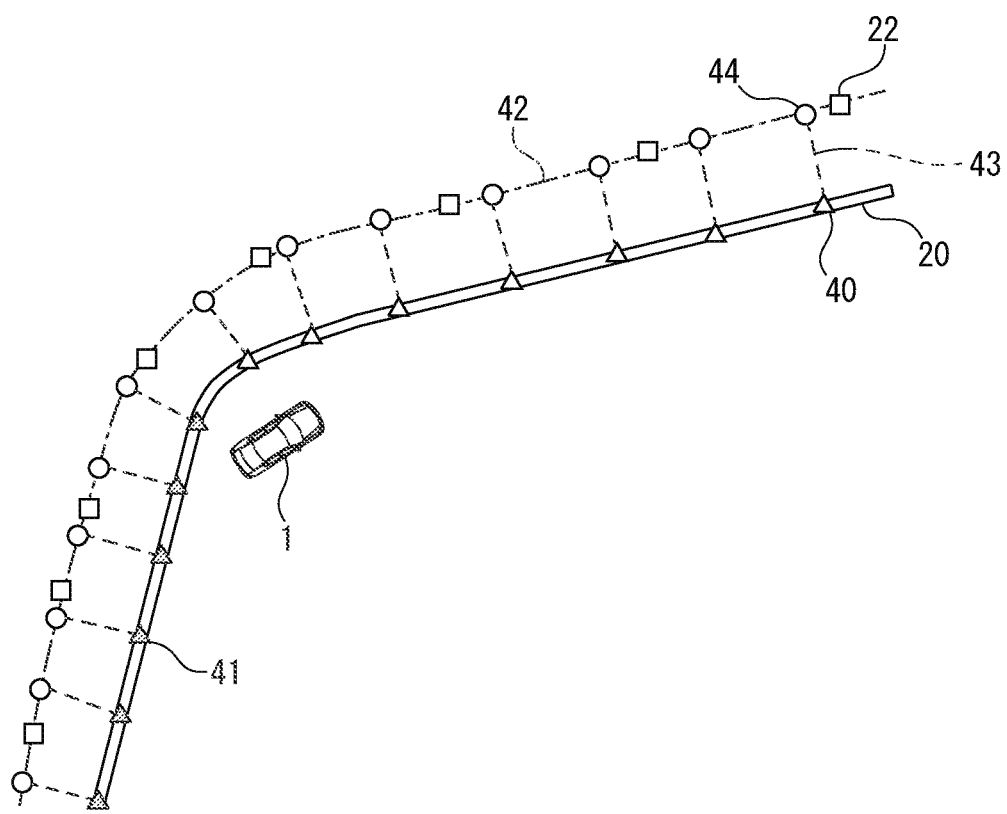
FIG. 5 is an explanatory diagram of an example of matching processing between a lane boundary line and map information.

FIG. 5 is now referred to. White triangle marks 40 are detection points in a detection portion 21 detected by the object sensors 11. Hatched triangle marks 41 are a history of detection points detected in the past. An alternate long and short dash line 42 is a lane boundary formed by boundary points 22 in the map information. The lane boundary 42 may, for example, be calculated by interpolation of the boundary points 22.

The lane matching unit 35a drops perpendiculars 43 from the detection points 40 and 41 to the lane boundary 42 and calculates feet 44 (round marks) of the perpendiculars 43 as corresponding points corresponding to the detection points 40 and 41.

Figure 4:
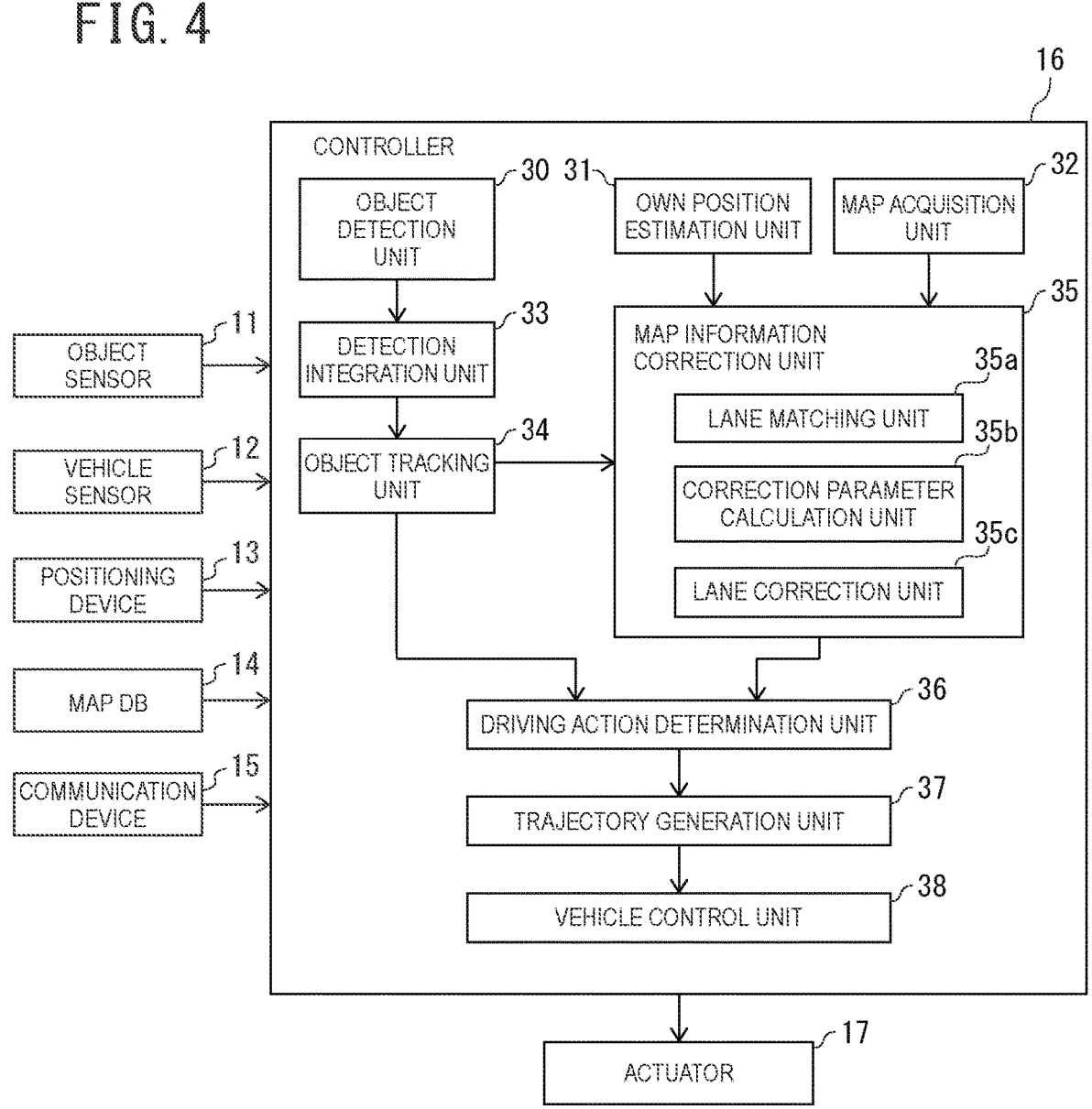
FIG. 4 is a block diagram illustrative of an example of a functional configuration of the driving assistance device of the embodiments.

FIG. 4 is now referred to. The correction parameter calculation unit 35b calculates translational correction parameters M, which are correction amounts by which boundary points 22 are corrected by translation, and rotational correction parameters R, which are correction amounts by which boundary points 22 are corrected by rotation. The correction parameter calculation unit 35*b* independently calculates, with respect to each of the left side boundary points 22L and the right side boundary points 22R, translational correction parameters M and rotational correction parameters R.

The translational correction parameters M are translational components (tx, ty) in an affine transformation matrix expressed by, for example, the formula (1) below:

[Math 1]

$$\begin{pmatrix} \cos\theta & -\sin\theta & tx \\ \sin\theta & \cos\theta & ty \\ 0 & 0 & 1 \end{pmatrix} \quad (1)$$

and the rotational correction parameters R are rotational components (cos θ, −sin θ, sin θ, cos θ) in the affine transformation matrix.

Note that the translational correction parameters M and the rotational correction parameters R are examples of a "translational correction amount" and a "rotational correction amount" described in the claims, respectively.

Figure 6A:
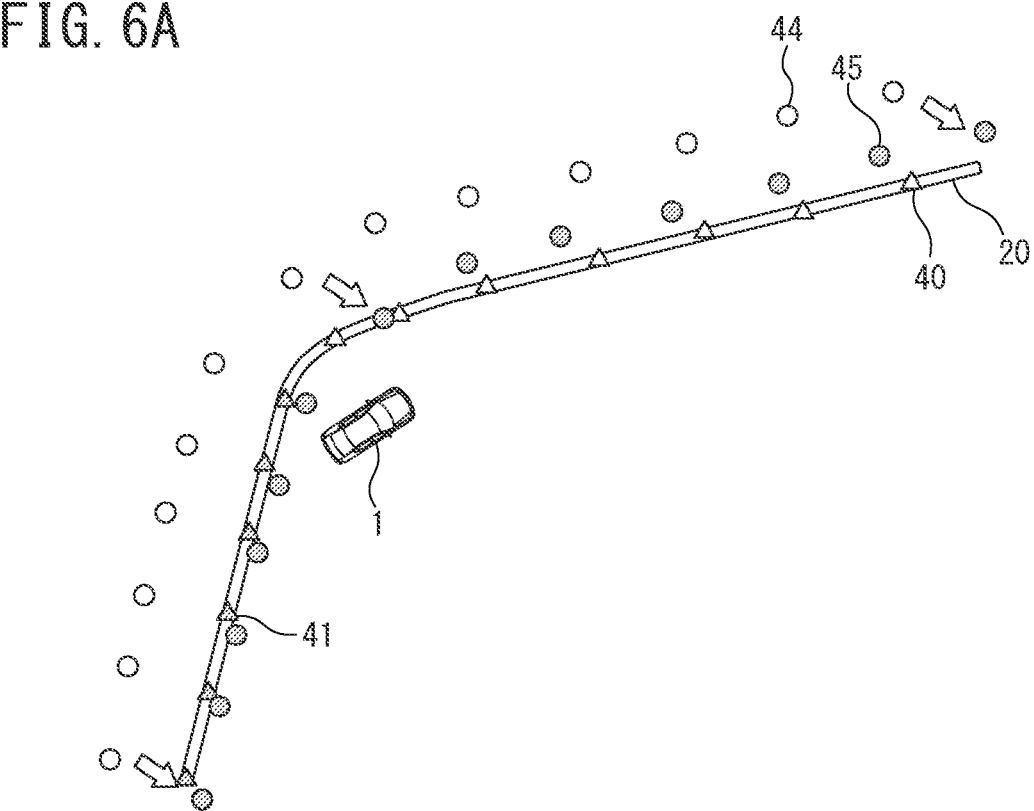
FIG. 6A is an explanatory diagram of an example of a calculation method of translational correction parameters.

FIG. 6A is now referred to. Hatched round marks 45 indicate points obtained by translating the corresponding points 44. The correction parameter calculation unit 35*b* calculates a translation amount that minimizes error between the corresponding points 45 after translation and the detection points 40 and 41 as the translational correction parameters M.

For example, the correction parameter calculation unit 35*b* calculates a translation amount that minimizes the square sum of differences in positions between the corresponding points 45 after translation and the detection points 40 and 41 as the translational correction parameters M.

Figure 6B:
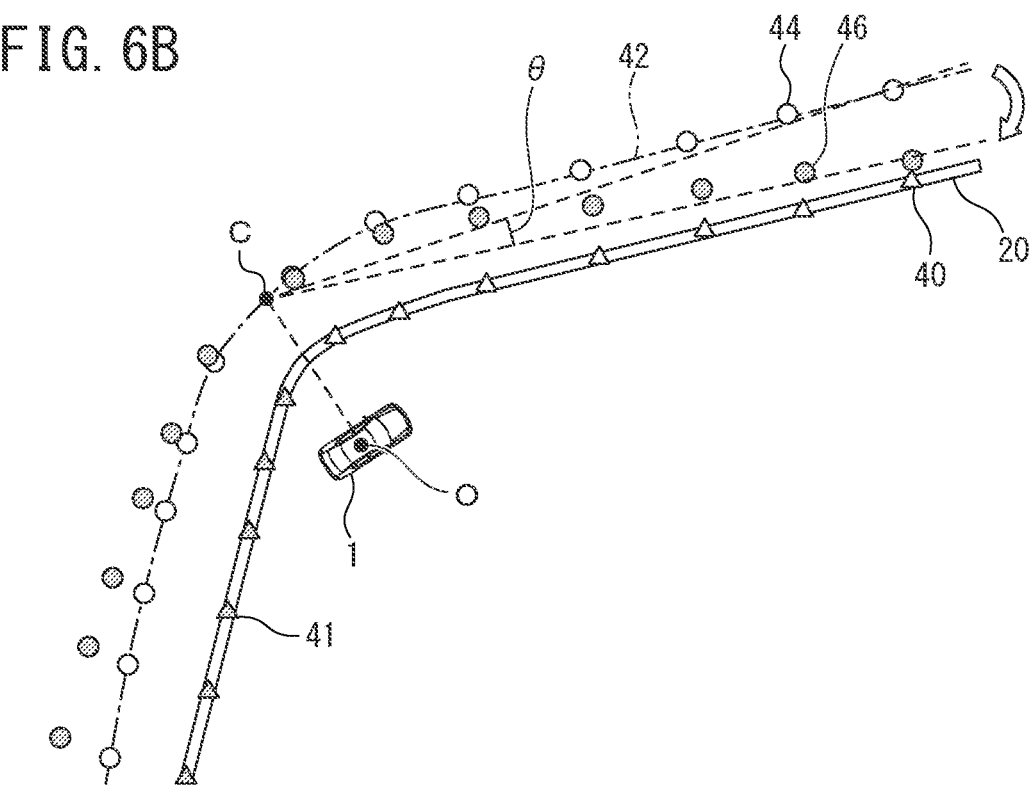
FIG. 6B is an explanatory diagram of an example of a calculation method of rotational correction parameters.

FIG. 6B is now referred to. Hatched round marks 46 indicate points obtained by rotating the corresponding points 44 about a rotation center C as the center. The correction parameter calculation unit 35*b* sets the rotation center C on a line representing the lane boundary 42 on the map. For example, the correction parameter calculation unit 35*b* may set the rotation center C in such a way that the longitudinal position of the rotation center C along the lane 2 coincides with the longitudinal position of a current position O of the own vehicle 1. The current position O of the own vehicle 1 is only required to be, for example, any point of the own vehicle 1 and may be, for example, the central position of the own vehicle 1 or the central position of the front edge of the own vehicle 1.

The correction parameter calculation unit 35*b* calculates a rotation amount θ that minimizes error between the corresponding points 46 after moving and the detection points 40 and 41 and calculates rotational components (cos θ, −sin θ, sin θ, cos θ) according to the rotation amount θ, which are elements in the above-described formula (1), as the rotational correction parameters R.

For example, the correction parameter calculation unit 35*b* calculates a rotation amount θ that minimizes the square sum of differences in positions between the corresponding points 46 after moving and the detection points 40 and 41 and calculates rotational components according to the rotation amount θ in the above-described formula (1) as the rotational correction parameters R.

FIG. 4 is now referred to. The lane correction unit 35*c* corrects, according to the translational correction parameters M and the rotational correction parameters R calculated by the correction parameter calculation unit 35*b*, the positions of the boundary points 22 included in the map information (that is, the positions of the boundary points 22 on the map).

The lane correction unit 35*c* independently corrects the left side boundary points 22L and the right-side boundary points 22R.

Figure 7:
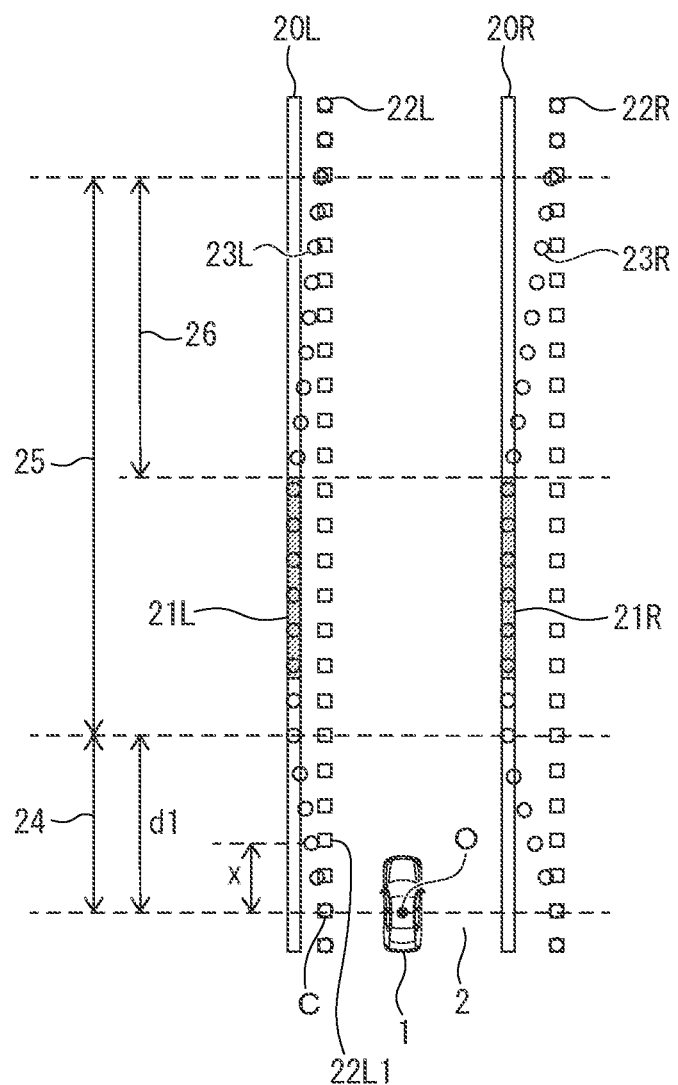
FIG. 7 is an explanatory diagram of an example of a map information correction method of a first embodiment.

FIG. 7 is now referred to. The lane correction unit 35*c* corrects the positions of boundary points 22 (that is, the positions of the lane boundary lines) by a larger translational correction amount in the second region 25, which is comparatively far from the own vehicle 1, than in the first region 24, which is comparatively close to the own vehicle 1. In addition, the lane correction unit 35*c* corrects the positions of boundary points 22 (that is, the positions of the lane boundary lines) by a larger rotational correction amount in the first region 24 than in the second region 25.

For example, the lane correction unit 35*c* may set a region located ahead of the own vehicle 1 and within a first predetermined distance d1 from the current position O of the own vehicle 1 as the first region 24 and set a region located ahead of the own vehicle 1 and farther than the first predetermined distance d1 from the current position O of the own vehicle 1 as the second region 25.

In the second region 25, the lane correction unit 35*c* corrects the positions of boundary points 22 by the translational correction parameters M and does not rotate the boundary points 22.

In contrast, in the first region 24, the lane correction unit 35*c* corrects boundary points 22 by the weighted sum of the rotational correction parameters R and the translational correction parameters M.

The lane correction unit 35*c*, for example, determines, according to longitudinal distance x between the own vehicle 1 and a boundary point 22L1, weights of the rotational correction parameters R and the translational correction parameters M by which the boundary point 22L1 is corrected.

The lane correction unit 35*c* determines the weight of the rotational correction parameters R to be larger as the longitudinal distance x is shorter.

The lane correction unit 35*c* may correct a boundary point 22L1 by, for example, a correction amount calculated by the formula (2) below.

$$\text{Correction amount} = ((d1-x)/d1) \times R + (x/d1) \times M \quad (2)$$

Performing weighting in this way causes a boundary point 22 to be corrected by a smaller translation amount as the boundary point 22 is located closer to the own vehicle 1. Thus, even when the boundary points 22 in the map information are corrected while the self-driving control is in execution, it is possible to reduce behavior change of the own vehicle 1.

Note that, in a region 26, within the second region 25, that is located ahead of and farther than a range in which the positions of the lane boundary lines were detected (that is, the detection portions 21), the lane correction unit 35*c* may reduce a correction amount by which the position of a boundary point 22 is translated by a larger amount as the longitudinal distance between the own vehicle 1 and the boundary point 22 is farther. Because of this configuration, it is possible to preferentially use map information in a distant region where no detection result of the lane boundary lines can be acquired.

The lane correction unit 35c stores corrected map information in the map database 14. That is, the lane correction unit 35c updates the map database 14 with the corrected map information. When the map information is acquired from an external map data server, the lane correction unit 35c updates the map information in the external map data server with the corrected map information.

The map information correction unit 35 executes the above-described correction processing iteratively at a predetermined processing period. That is, the map information correction unit 35 acquires map information corrected and stored in the previous period from the map database 14 (or acquires the map information from the external map data server) and further corrects the acquired map information by the above-described correction processing.

Note that an upper limit may be set for a correction amount by which map information can be corrected in one processing period. That is, the correction parameter calculation unit 35b may limit the magnitudes of the rotational correction parameters R and the translational correction parameters M to less than or equal to a predetermined upper limit. Since, because of this configuration, excessive correction of the boundary points 22 can be avoided, even when the boundary points 22 in the map information are corrected while the self-driving control is in execution, it is possible to reduce behavior change of the own vehicle 1.

The first predetermined distance d1, which defines length of the first region 24, may, for example, be set according to an upper limit of lateral acceleration that is allowed to be generated in the own vehicle 1 and a correction amount by which the positions of the boundary points 22 are corrected in the lateral direction. Specifically, the first predetermined distance d1 may be set according to vehicle speed of the own vehicle 1, an upper limit of lateral acceleration, and a lateral component of the translational correction parameters M.

When an upper limit of the correction amount by which map information can be corrected in one processing period is set, the first predetermined distance d1 may be set according to, in place of the lateral component of the translational correction parameters M, an upper limit of a lateral correction amount.

In addition, the first predetermined distance d1 may be set depending on the positions of the lane boundary lines 20 detected by the object sensors 11, that is, the positions of the detection portions 21.

Figure 8:
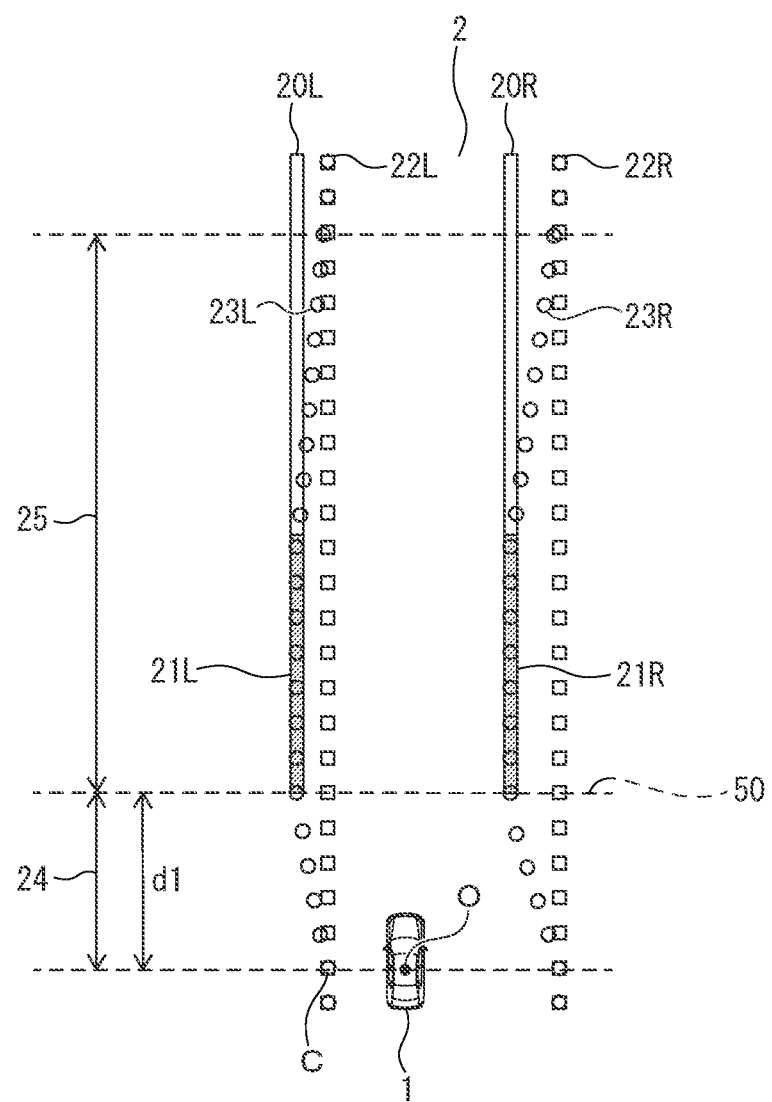
FIG. 8 is an explanatory diagram of another example of the map information correction method of the first embodiment.

FIG. 8 is now referred to. For example, at an intersection or the like, the lane boundary lines 20 are interrupted. Thus, the lane boundary lines 20 are not set in place in a range closer to the own vehicle 1 than a longitudinal position 50, and the object sensors 11 do not detect the lane boundary lines 20 in a region closer to the own vehicle 1 than the longitudinal position 50.

For example, the lane correction unit 35c sets a longitudinal distance from the longitudinal position 50, which is the closest position that allows the lane boundary lines 20 to be detected, to the current position O of the own vehicle 1 as the first predetermined distance d1.

Because of this configuration, when the own vehicle 1 is located in a region where the lane boundary lines 20 are not set in place, the region where the lane boundary lines 20 are not set in place can be set as the first region 24.

As a result, in the region where the lane boundary lines 20 are not set in place, it is possible to reduce the translational correction amount and thereby reduce behavior change of the own vehicle 1.

FIG. 4 is now referred to. The driving action determination unit 36 determines, based on detection results acquired by the detection integration unit 33 and the object tracking unit 34 and map information corrected by the map information correction unit 35, a schematic driving action of the own vehicle 1 that the driving assistance device 10 is to execute.

Examples of the driving action that the driving action determination unit 36 determines include, for example, stopping, temporary stopping, traveling speed, deceleration, acceleration, course change, right turn, left turn, traveling straight, lane change at a merging section or between a plurality of lanes, lane keeping, overtaking, response to an obstacle of the own vehicle 1, and the like.

The driving action determination unit 36 generates, based on the map information corrected by the map information correction unit 35 and the positions and attitudes of objects around the own vehicle 1, a route space map that represents existence or nonexistence of a route and an object around the own vehicle 1 and a risk map in which a degree of risk of a traveling field is quantified. The driving action determination unit 36 generates, based on the route space map and the risk map, a driving action plan of the own vehicle 1.

The trajectory generation unit 37 generates, based on a driving action determined by the driving action determination unit 36, motion characteristics of the own vehicle 1, and the route space map, candidates of a travel trajectory (a travel trajectory represented by relative positions with respect to the lane boundary lines 20) along which and a speed profile in accordance with which the own vehicle 1 is caused to travel.

The trajectory generation unit 37 evaluates future risks of the respective candidates, based on the risk map, selects an optimum travel trajectory and speed profile, and sets the selected travel trajectory and speed profile as a target travel trajectory along which and a target speed profile in accordance with which the own vehicle 1 is caused to travel, respectively.

The vehicle control unit 38 drives the actuators 17 in such a way that the own vehicle 1 travels along the target travel trajectory at a speed in accordance with the target speed profile generated by the trajectory generation unit 37.

(Operation)

Figure 9:
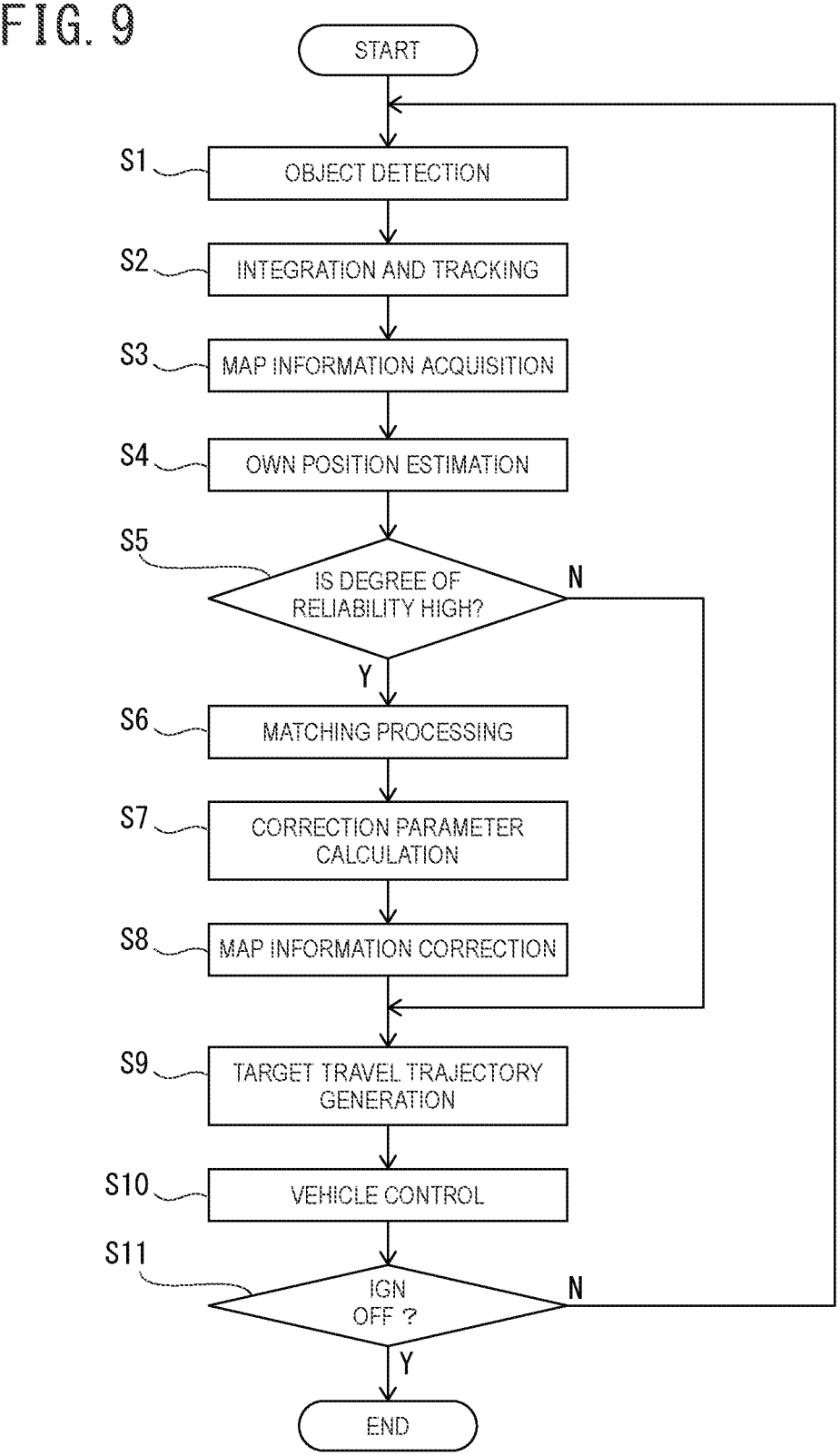
FIG. 9 is a flowchart of an example of the map information correction method of the embodiments.

Next, an example of operation of the driving assistance device 10 in the embodiment will be described with reference to FIG. 9.

In step S1, the object detection unit 30, using a plurality of object detection sensors, detects relative positions with respect to the own vehicle 1, attitudes, sizes, speeds, and the like of objects, including lane boundary lines, around the own vehicle 1.

In step S2, the detection integration unit 33 integrates a plurality of detection results acquired respectively from a plurality of object detection sensors and outputs one detection result with respect to each of the respective objects. The object tracking unit 34 tracks the respective objects that were detected and integrated and predicts behavior of the objects around the own vehicle 1. In this processing, the positions of the lane boundary lines 20, which are set in place on the road surface around the own vehicle 1, are detected.

In step S3, the map acquisition unit 32 acquires map information indicating a structure of a road on which the own vehicle 1 is to travel.

In step S4, the own position estimation unit 31 measures, based on a measurement result by the positioning device 13 and odometry using detection results from the vehicle sensors 12, the position, attitude, and speed of the own vehicle 1 with respect to a predetermined reference point.

In step S5, the map information correction unit 35 determines whether or not the degree of reliability of a detection result of the detection portions 21 of the lane boundary lines 20 is high. When the degree of reliability is high (step S5: Y), the process proceeds to step S6. When the degree of reliability is not high (step S5: N), the process proceeds to step S9.

In step S6, the lane matching unit 35a executes matching processing. In the matching processing, the lane matching unit 35a identifies positions on the map (corresponding points 44) corresponding to points that the object sensors 11 detected as the detection portions 21.

In step S7, the correction parameter calculation unit 35b calculates translational correction parameters M and rotational correction parameters R.

In step S8, the lane correction unit 35c corrects, according to the translational correction parameters M and the rotational correction parameters R, the positions of the boundary points 22 included in the map information (that is, the positions of the boundary points 22 on the map).

In step S9, the driving action determination unit 36 determines a driving action, based on detection results acquired by the detection integration unit 33 and the object tracking unit 34 and the map information corrected by the map information correction unit 35. The trajectory generation unit 37 generates, based on the driving action determined by the driving action determination unit 36, motion characteristics of the own vehicle 1, and the map information corrected by the map information correction unit 35, a target travel trajectory along which and a target speed profile in accordance with which the own vehicle 1 is caused to travel.

When the degree of reliability of the detection result of the detection portions 21 is not high (step S5: N), since steps S6 to S8, in which the map information is corrected, are skipped, map information that had been corrected up until the previous period is used in step S9.

In step S10, the vehicle control unit 38 drives the actuators 17 in such a way that the own vehicle 1 travels along the target travel trajectory at a speed in accordance with the target speed profile generated by the trajectory generation unit 37.

In step S11, whether or not an ignition switch (IGN) of the own vehicle 1 has been turned off is determined. When the ignition switch has not been turned off (step S11: N), the process returns to step S1. When the ignition switch has been turned off (step S11: Y), the process is terminated.

(Advantageous Effects of First Embodiment)

(1) The controller 16 executes a map information correction method for correcting map information including information of lane boundary lines, which are formed by the boundary points 22. The object detection unit 30, the detection integration unit 33, and the object tracking unit 34 detect relative positions with respect to the own vehicle of the lane boundary lines 20, which are set in place on a road surface around the own vehicle 1. The own position estimation unit 31 estimates an own position of the own vehicle 1. The map information correction unit 35 corrects, depending on the estimated own position and the detected relative positions of the lane boundary lines 20, the positions of the lane boundary lines formed by the boundary points 22 included in the map information by, in the first region 24, which is comparatively close to the own vehicle 1, a larger rotational correction amount than in the second region 25, which is comparatively far from the own vehicle 1, and, in the second region 25, a larger translational correction amount than in the first region 24.

In the first region 24, which is comparatively close to the own vehicle 1, since, because of this configuration, the translational correction amount becomes small, even when the lane boundary lines formed by the boundary points 22 in the map information are corrected while the self-driving control is in execution, it is possible to reduce behavior change of the own vehicle 1.

In the second region 25, which is comparatively far from the own vehicle 1, since the rotational correction amount becomes small, it is possible to reduce a deviation amount between the corrected boundary points 23 and the actual lane boundary lines 20.

(2) In the first region 24, the rotational correction amount and the translational correction amount may be weighted according to longitudinal distance in such a manner that the weight of the rotational correction amount becomes larger as the longitudinal distance between the own vehicle 1 and a boundary point 22 is shorter (for a part of a lane boundary line having a shorter longitudinal distance from the own vehicle 1).

Because of this configuration, a boundary point 22 closer to the own vehicle 1 (a part of a lane boundary line closer to the own vehicle 1) is corrected by a smaller translation amount. Thus, even when the lane boundary lines in the map information are corrected while the self-driving control is in execution, it is possible to reduce behavior change of the own vehicle 1.

(3) The lane correction unit 35c may set a region located ahead of the own vehicle 1 and within the first predetermined distance d1 from the position of the own vehicle 1 as the first region 24 and set a region located ahead of the own vehicle 1 and farther than the first predetermined distance d1 from the position of the own vehicle 1 as the second region 25.

Because of this configuration, it is possible to appropriately set the first region 24 that is comparatively close to the own vehicle 1 and the second region 25 that is comparatively far from the own vehicle 1.

(4) The lane correction unit 35c may set the first predetermined distance d1 according to an upper limit of lateral acceleration that is generated in the own vehicle 1 and a correction amount by which the positions of the boundary points 22 (lane boundary lines) are corrected in the lateral direction.

Because of this configuration, it is possible to extend the length of the first region 24, in which the translational correction amount is comparatively small, according to the upper limit of lateral acceleration and the lateral correction amount. Therefore, it is possible to reduce behavior change of the own vehicle 1.

(5) The lane correction unit 35c may set the first predetermined distance d1 depending on the positions of the detected lane boundary lines 20.

Because of this configuration, when the own vehicle 1 is located in a region where the lane boundary lines 20 are not set in place, it is possible to set the region where the lane boundary lines 20 are not set in place as the first region 24. Therefore, in the region where the lane boundary lines 20 are not set in place, it is possible to reduce the translational correction amount and thereby reduce behavior change of the own vehicle 1.

(6) The lane correction unit 35c may, in a region located ahead of and farther than a range in which the positions of the lane boundary lines 20 are detected, reduce a correction amount of the position of a boundary point 22 by a larger amount as the longitudinal distance between the own vehicle 1 and the boundary point 22 is farther.

Because of this configuration, it is possible to preferentially use map information in a distant region where no detection result of the lane boundary lines 20 can be acquired.

(7) The lane correction unit 35c may independently correct the positions of boundary points 22 on the right side of the lane and the positions of boundary points 22 on the left side of the lane. Because of this configuration, even when distance between the actually detected left side lane boundary line 20L and right side lane boundary line 20R differs from a lane width on the map, it is possible to appropriately correct the left side boundary points 22L and the right side boundary points 22R depending on detection positions that are actually detected as the left side lane boundary line 20L and the right side lane boundary line 20R.

Second Embodiment

Next, a second embodiment will be described. A map information correction unit 35 of the second embodiment corrects positions of lane boundary lines (boundary points 22) by only a rotational correction amount in a first region 24 and only a translational correction amount in a second region 25.

Figure 10A:
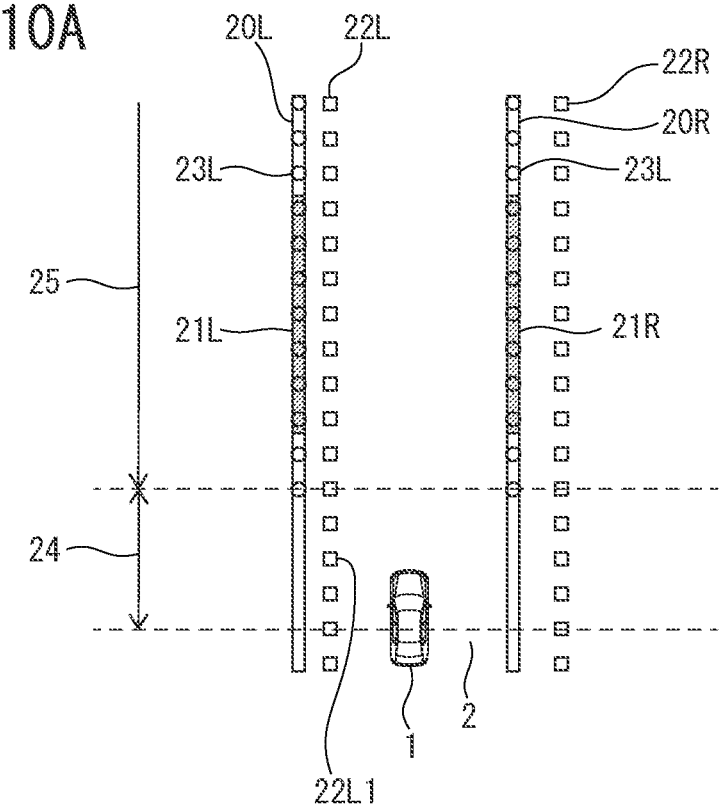
FIG. 10A is an explanatory diagram of an example of a map information correction method of a second embodiment.

FIG. 10A is now referred to. First, in the second region 25, a lane correction unit 35c corrects the positions of boundary points 22 by translational correction parameters M and does not rotate the boundary points 22.

Figure 10B:
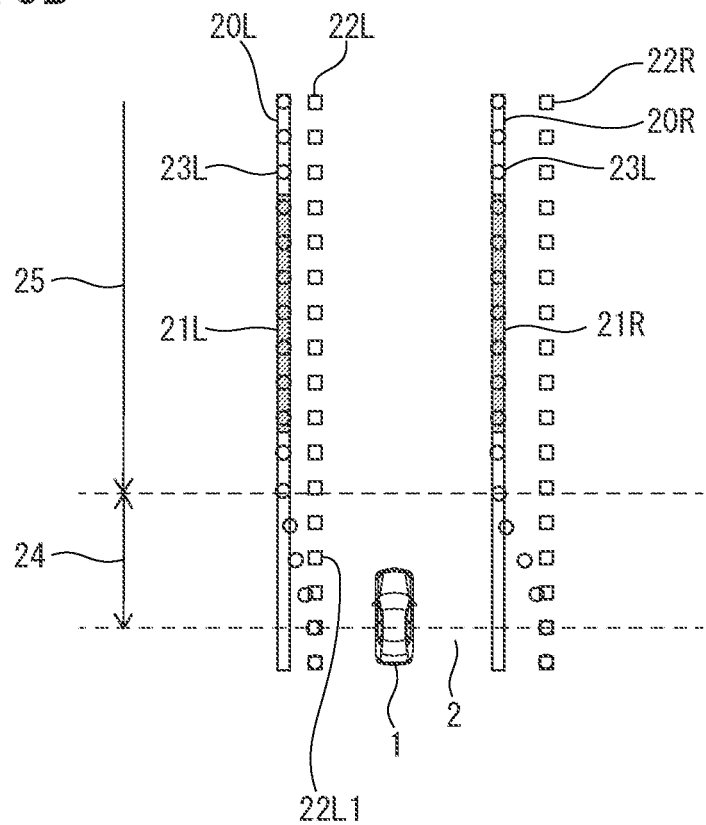
FIG. 10B is another explanatory diagram of the example of the map information correction method of the second embodiment.

Next, as illustrated in FIG. 10B, the lane correction unit 35c determines rotation angles of boundary points 22 in the first region 24 in such a way that lane boundaries in the first region 24 and lane boundaries in the second region 25, which are formed by corrected boundary points 23, connect to each other at a boundary position between the first region 24 and the second region 25.

Note that, in place of determining rotation angles in such a way that the lane boundaries in the first region 24 and the lane boundaries in the second region 25 connect to each other, the boundary points 22 in the first region 24 may be rotated by rotational correction parameters R. In this case, first predetermined distance d1 (that is, length of the first region 24) may be adjusted in such a way that the lane boundaries in the first region 24 and the lane boundaries in the second region 25 connect to each other at the boundary position between the first region 24 and the second region 25.

(Advantageous Effects of Second Embodiment)

The lane correction unit 35c corrects the positions of the boundary points 22 by only the rotational correction amount in the first region 24 and only the translational correction amount in the second region 25.

For example, the lane correction unit 35c may correct the positions of the boundary points 22 by rotating the positions of boundary points 22 in the first region 24 in such a way that the lane boundaries in the first region 24 and the lane boundaries in the second region 25 connect to each other.

Even when the positions of the boundary points 22 are corrected as described above, it is, as with the first embodiment, possible to reduce the translational correction amount in the first region 24, which is comparatively close to an own vehicle 1. In addition, it is possible to reduce the rotational correction amount in the second region 25, which is comparatively far from the own vehicle 1.

Third Embodiment

Next, a third embodiment will be described. In the third embodiment, a region that is comparatively close to an own vehicle 1 and a region that is comparatively far from the own vehicle 1 are defined in a first region 24, and positions of boundary points 22 are, as with the second embodiment, corrected by only a rotational correction amount in the comparatively close region and the rotational correction amount and a translational correction amount are, as with the first embodiment, weighted in the comparatively far region.

Figure 11:
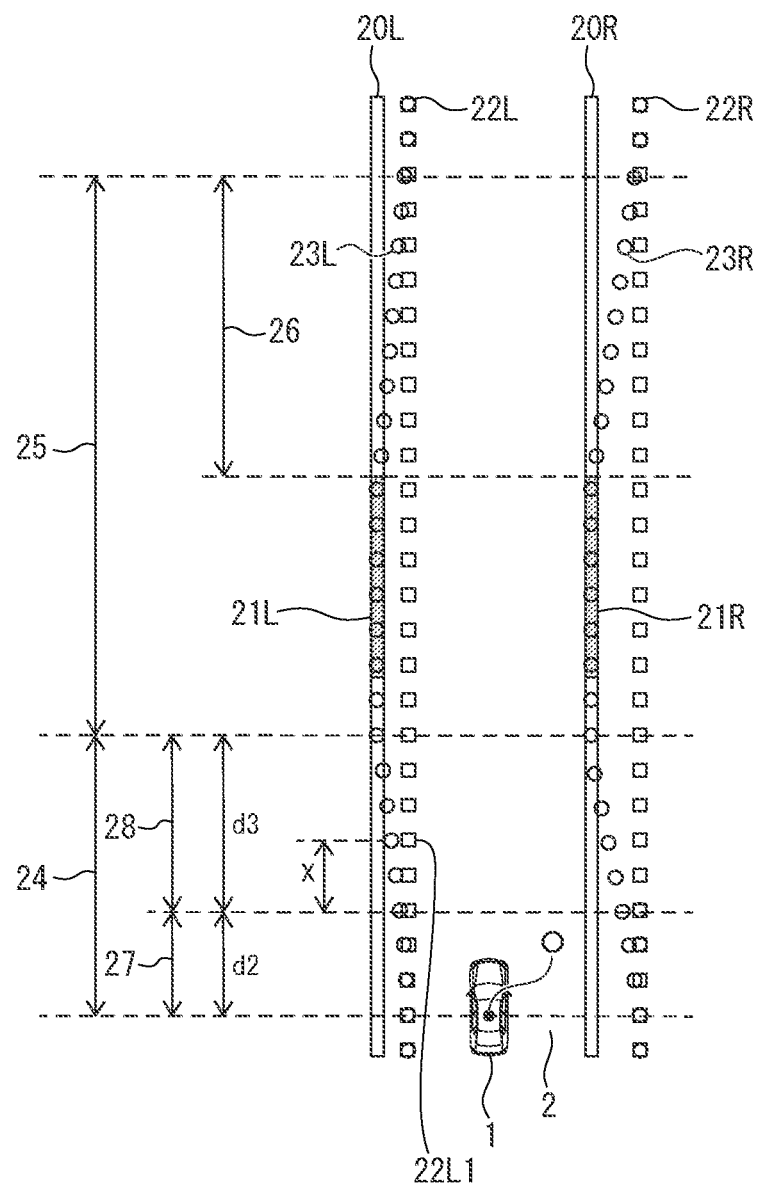
FIG. 11 is an explanatory diagram of an example of a map information correction method of a third embodiment.

FIG. 11 is now referred to. The first region 24 includes a third region 27 that is a region located ahead of the own vehicle 1 and within a second predetermined distance d2 from the position of the own vehicle 1 and a fourth region 28 that is a region located ahead of the own vehicle 1 and farther than the second predetermined distance d2 from the position of the own vehicle 1.

In the third region 27, a lane correction unit 35c corrects the positions of boundary points 22 by only rotation using rotational correction parameters R.

On the other hand, in the fourth region 28, the lane correction unit 35c corrects boundary points 22 using the weighted sum of the rotational correction parameters R and translational correction parameters M.

The lane correction unit 35c may, for example, determine weights of the rotational correction parameters R and the translational correction parameters M by which a boundary point 22L1 is corrected, in such a manner that the weight of the rotational correction parameter R becomes larger as longitudinal distance between the own vehicle 1 and the boundary point 22L1 is shorter.

For example, when length of the fourth region 28 is denoted by d3 and longitudinal distance from a boundary position between the third region 27 and the fourth region 28 to the boundary point 22L1 is denoted by x, the lane correction unit 35c may correct the boundary point 22L1 by, for example, a correction amount calculated by the formula (3) below.

$$\text{Correction amount}=((d3-x)/d3) \times R+(x/d3) \times M \qquad (3)$$

(Advantageous Effects of Third Embodiment)

The first region 24 includes the third region 27 that is a region located ahead of the own vehicle 1 and within the second predetermined distance d2 from the position of the own vehicle 1 and the fourth region 28 that is a region located ahead of the own vehicle 1 and farther than the second predetermined distance d2 from the position of the own vehicle 1. In the third region 27, the lane correction unit 35c corrects the positions of boundary points 22 by only the rotational correction amount. In the fourth region 28, the rotational correction amount and the translational correction amount are weighted according to longitudinal distance in such a manner that the weight of the rotational correction amount becomes larger as the longitudinal distance between the own vehicle 1 and a boundary point 22 is shorter.

Because of this configuration, it is possible to set the third region 27 where the positions of boundary points 22 are corrected by only the rotational correction amount and a second region 25 where the positions of boundary points 22 are corrected by only the translation amount, and it is also possible to set, between the third region 27 and the second region 25, the fourth region 28 where the weights of the rotational correction parameters R and the translational correction parameters M gradually change as a buffer region.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
10 Driving assistance device
11 Object sensor
12 Vehicle sensor
13 Positioning device
14 Map database
15 Communication device
16 Controller
17 Actuator
18 Processor
19 Storage device
30 Object detection unit
31 Own position estimation unit
32 Map acquisition unit
33 Detection integration unit
34 Object tracking unit
35 Map information correction unit
35a Lane matching unit
35b Correction parameter calculation unit
35c Lane correction unit
36 Driving action determination unit
37 Trajectory generation unit
38 Vehicle control unit

The invention claimed is:

1. A map information correction method for correcting map information including information of a lane boundary line, the method comprising:
   detecting a position with respect to an own vehicle of a lane boundary line set in place on a road surface around the own vehicle;
   estimating an own position on a map of the own vehicle;
   correcting, depending on the estimated own position and the detected position of the lane boundary line, a position of the lane boundary line included in the map information by, in a first region, a larger rotational correction amount than in a second region that is further away from the own vehicle than the first region and, in the second region, a larger translational correction amount than in the first region; and
   utilizing the corrected position of the lane boundary line to control at least one component of the own vehicle.

2. The map information correction method according to claim 1, further comprising:
   in the first region, weighing, in such a manner that a weight of the rotational correction amount becomes larger for the lane boundary line at a position having a shorter longitudinal distance from the own vehicle, the rotational correction amount and the translational correction amount according to the longitudinal distance.

3. The map information correction method according to claim 1, further comprising correcting a position of the lane boundary line by only the rotational correction amount in the first region and only the translational correction amount in the second region.

4. The map information correction method according to claim 3, further comprising correcting a position of the lane boundary line by rotating a position of the lane boundary line in the first region in such a way that a lane boundary line in the first region and a lane boundary line in the second region connect to each other.

5. The map information correction method according to claim 1, wherein the first region is a region located ahead of the own vehicle and within a predetermined distance from a position of the own vehicle and the second region is a region located ahead of the own vehicle and farther than the predetermined distance from a position of the own vehicle.

6. The map information correction method according to claim 5, wherein
   the first region includes a third region, the third region being a region located ahead of the own vehicle and within a second predetermined distance from a position of the own vehicle, and a fourth region, the fourth region being a region located ahead of the own vehicle and farther than the second predetermined distance from a position of the own vehicle, the method further comprising:
   in the third region, correcting a position of the lane boundary line by only the rotational correction amount; and
   in the fourth region, weighing, in such a manner that a weight of the rotational correction amount becomes larger for the lane boundary line at a position having a shorter longitudinal distance from the own vehicle, the rotational correction amount and the translational correction amount according to the longitudinal distance.

7. The map information correction method according to claim 5, further comprising setting the predetermined distance according to an upper limit of lateral acceleration generated in the own vehicle and a correction amount by which a position of the lane boundary line is corrected in a lateral direction.

8. The map information correction method according to claim 5, further comprising setting the predetermined distance depending on a detected position of the lane boundary line.

9. The map information correction method according to claim 1, further comprising, in a region located ahead of and farther than a range where a position of the lane boundary line is detected, reducing a correction amount of a position of a boundary point by a larger amount for the lane boundary line at a position having a farther longitudinal distance from the own vehicle.

10. The map information correction method according to claim 1, further comprising independently correcting a position of the lane boundary line on a right side of a lane and a position of the lane boundary line on a left side of the lane.

11. A driving assistance method in which a map information correction method includes correcting map information including information of a lane boundary line, the driving assistance method comprising:
   detecting a position with respect to an own vehicle of a lane boundary line or a demarcation line set in place on a road surface around the own vehicle;
   estimating an own position on a map of the own vehicle;
   correcting, depending on the estimated own position and the detected position of the lane boundary line, a position of the lane boundary line included in the map information by, in a first region, a larger rotational correction amount than in a second region that is further from the own vehicle than the first region and, in the second region, a larger translational correction amount than in the first region;
   generating a travel trajectory, based on the corrected position of the lane boundary line; and assisting driving in such a way that an own vehicle travels along a generated travel trajectory.

12. A map information correction device configured to correct map information including information of a boundary point forming a lane boundary, comprising:
a sensor configured to detect a position of a lane boundary line set in place on a road surface around an own vehicle; and
a controller configured to:
estimate an own position of the own vehicle;
correct, depending on the estimated own position and the detected position of the lane boundary line, a position of the boundary point included in the map information by, in a first region, a larger rotational correction amount than in a second region that is further from the own vehicle than the first region and, in the second region, a larger translational correction amount than in the first region; and
utilize the corrected position of the boundary point to control at least one component of the own vehicle.

* * * * *